(12) United States Patent  
Mardiks et al.

(10) Patent No.: US 8,996,795 B2
(45) Date of Patent: *Mar. 31, 2015

(54) STORAGE DEVICE FOR MOUNTING TO A HOST

(75) Inventors: Eitan Mardiks, Ra'anana (IL); Donald Ray Bryant-Rich, Haifa (IL)

(73) Assignee: SanDisk IL Ltd., Kfar Saba (IL)

( * ) Notice: Subject to any disclaimer, the term of this patent is extended or adjusted under 35 U.S.C. 154(b) by 243 days.

This patent is subject to a terminal disclaimer.

(21) Appl. No.: 13/553,383

(22) Filed: Jul. 19, 2012

(65) Prior Publication Data

US 2012/0284455 A1 Nov. 8, 2012

Related U.S. Application Data

(63) Continuation of application No. 12/221,841, filed on Aug. 6, 2008, now Pat. No. 8,250,247.

(51) Int. Cl.
*G06F 12/02* (2006.01)
*G06F 13/38* (2006.01)

(52) U.S. Cl.
CPC .................................. *G06F 13/385* (2013.01)
USPC ........... 711/103; 711/149; 711/154; 711/156; 710/14

(58) Field of Classification Search
USPC ...................... 711/103, 149, 154, 156; 710/14
See application file for complete search history.

(56) References Cited

U.S. PATENT DOCUMENTS

| | | | |
|---|---|---|---|
| 6,795,327 B2 | 9/2004 | Deng et al. | |
| 7,136,951 B2 | 11/2006 | Deng et al. | |
| 7,330,912 B1 * | 2/2008 | Fox et al. | 710/8 |
| 7,814,237 B2 * | 10/2010 | Lee et al. | 710/14 |
| 2004/0025034 A1 | 2/2004 | Alessi et al. | |
| 2005/0033917 A1 | 2/2005 | Takeuchi | |
| 2005/0097241 A1 | 5/2005 | Lee | |
| 2005/0249510 A1 | 11/2005 | Ito et al. | |
| 2007/0058464 A1 | 3/2007 | Nakanishi | |
| 2007/0106823 A1 | 5/2007 | Yang et al. | |
| 2008/0005456 A1 | 1/2008 | Watanabe et al. | |
| 2008/0172520 A1 | 7/2008 | Lee | |
| 2008/0244619 A1 | 10/2008 | Jeon et al. | |
| 2009/0113128 A1 | 4/2009 | Zhao | |
| 2009/0193153 A1 | 7/2009 | Thanos | |

FOREIGN PATENT DOCUMENTS

| | | |
|---|---|---|
| EP | 0443876 | 8/1991 |
| WO | WO 2005/059755 | 6/2005 |

OTHER PUBLICATIONS

IBM. "Detachable Copyright Protected Software Memory Device", *IBM Technical Disclosure Bulletin*, Sep. 25, 2006, pp. 1-5.
Search Report and Written Opinion for PCT/US2009/004363, dated Oct. 29, 2009, 8 pages.
"Battling Anti-Forensics: Beating the U3 Stick", Thijs Bosschert, *Journal of Digital Forensics Practice*, 2006, pp. 265-273.

* cited by examiner

*Primary Examiner* — Stephen Elmore
(74) *Attorney, Agent, or Firm* — Brinks Gilson & Lione

(57) ABSTRACT

A storage device comprising a non-volatile memory for storing data, and an input device that is operative to select an operating mode of the storage device prior to mounting the storage device, such that each operating mode represents a different type of storage device. A controller interfaces with the input device to establish the selected operating mode of the storage device once the storage device is mounted.

26 Claims, 4 Drawing Sheets

STORAGE DEVICE FOR MOUNTING TO A HOST

CROSS-REFERENCE TO RELATED APPLICATION

This application is a continuation of U.S. patent application Ser. No. 12/221,841, filed Aug. 6, 2008 (now U.S. Pat. No. 8,250,247), which is hereby incorporated by reference herein.

FIELD OF THE INVENTION

The present invention relates generally to storage devices and more specifically a storage device that is used and operated for mounting to a host.

BACKGROUND OF THE INVENTION

Use of non-volatile based storage devices has been rapidly increasing over the years because they are portable and they have small physical size and large storage capacity. Storage devices come in a variety of designs.

Some storage devices, USB flash drives for example, are regarded as removable, which means that they are intended for removal from one host device to another, or for replacement with another storage device. Such removable devices are provided with a Universal Serial Bus ("USB") interface in order to allow them to be connected to a computer system, for example.

USB flash drives as such may employ a variety of possible features, some of which a user may want to set before connecting his/her to a host.

U3 based applications is an example for such a feature. For example, a USB flash drive that is configured to comply with the U3 technology may be set by a user as a U3 device/regular mass storage device before mounting the USB flash drive to a host.

U3 form factor devices (also called U3 smart drives) are flash drive based USB devices containing U3 based applications. One such type of device is created for Microsoft™ Windows™ OS (Operating System), for example. A U3 application is a software application that is tuned to run directly from a U3 device. While the U3 application is running, the U3 application has access to most of the host's computer resources, such as but not limited to the volume of the device, the system's registry, the network adapters, etc. The U3 platform provides application mobility that can be used by a user to take his/her favorite programs and files and use them on any computer. With such technology, software applications are not tied to a single machine. Rather, the software can run off any appropriately equipped and configured device without installation on the host computer.

However, the auto-install process that is required during setup for enabling the U3 functionality is time-consuming and sometimes not desired by users at all. Furthermore, this process can be disturbing when mounting the device to a host PC (Personal Computer) that is not the main computer and/or when using the device with a non-computing device, such as a DVD player.

Removing and uninstalling the U3 feature that comes pre-installed and embedded in the USB flash drive is one way to overcome this. However, once the U3 feature is uninstalled and removed from the device, it's impossible to use this feature with the device again.

According to another approach, users may disable the U3 feature "on-line", i.e., when the device is already mounted to a computer. In such case, users can prevent the U3 functionality from running automatically on their U3 smart drives by disabling this feature once the device is mounted to a host.

SUMMARY OF EXEMPLARY EMBODIMENTS OF THE INVENTION

In view of the foregoing observations and the present needs, it would be advantageous to have a storage device configured with an input device for selecting an operating mode of the storage device prior to mounting the storage device to a host.

In contrast to the existing technology, where setting a device to employ certain features is done when the device is mounted to a host, the storage device of the exemplary embodiments may be operable by a user to temporarily enable/disable a variety of possible features before connecting the device to a host.

Embodiments, various examples of which are discussed herein, include a storage device having a non-volatile memory for storing data; an input device that is operative to select an operating mode of the storage device prior to mounting the storage device; and a controller that is operative to control the non-volatile memory. Each operating mode represents a different type of storage device. The controller interfaces with the input device to establish the selected operating mode of the storage device once the storage device is mounted.

At least one type of storage device may represent a removable storage device. The storage device may be of type including one of a CD, a hard disk drive, or a floppy disk drive. The non-volatile memory may have a configuration in accordance with flash memory technology.

The input device may be a user-interface, and may include a mechanical switch, an optical sensor(s), a pressure sensor(s), etc.

According to yet another embodiment, a method of using a storage device includes selecting an operating mode of a storage device based on a setting of an input device of the storage device; mounting the storage device to a host; and establishing the selected operating mode of the storage device after it is mounted to the host. The selected operating mode is established based on the setting of the input device and each operating mode represents a different type of storage device. Again, at least one type of storage device may represent a removable storage device.

Additional features and advantages of the embodiments described are possible as will become apparent from the following drawings and description.

BRIEF DESCRIPTION OF THE DRAWINGS

For a better understanding of the various embodiments, reference is made to the accompanying drawings, in which like numerals designate corresponding sections or elements throughout, and in which.

DETAILED DESCRIPTION OF EXEMPLARY EMBODIMENTS

The embodiments and various aspects thereof are further described in more details below. This description is not intended to limit the scope of claims but instead to provide examples of such embodiments. The following discussion therefore presents exemplary embodiments, which include a storage device that is operable by an input device prior to mounting the storage device to a host. The storage device is a removable storage device that is configured for removal from the host.

The storage device of the present disclosure may comply with any type of memory device (e.g. flash memory) known in the art, and with memory device that will be devised in the future. The storage device may be a nonvolatile memory that retains its memory or stored state even when power is removed. The storage device may be an erasable programmable memory including, but not-limited to, Electrically-Erasable and Programmable Read-Only Memories (EE-PROMs), EPROM, Magnetoresistive Random Access Memory (MRAM), Ferroelectric RAM (FeRAM or FRAM).

The input device disclosed herein and the storage device using the input device do not depend on the type of memory, and may be implemented with any type of memory, whether it is a flash memory or a non-flash memory. The storage device using the input device disclosed herein may also comply with a 3-dimensional memory chip technology.

Digital cameras, cellular phones, media players/recorders (e.g., MP3 and MP4), hand-held or notebook computers, personal digital assistants (PDAs), network cards, network appliances, set-top boxes, and hand-held are exemplary hosts. A PDA is typically known as user-held computer systems implemented with various personal information management applications, such as an address book, a daily organizer, and electronic notepads, to name a few. The host and/or an external device may be in communication with the card adapter over a wired or a wireless communication channel well known to those skilled in the art.

Figure 1:
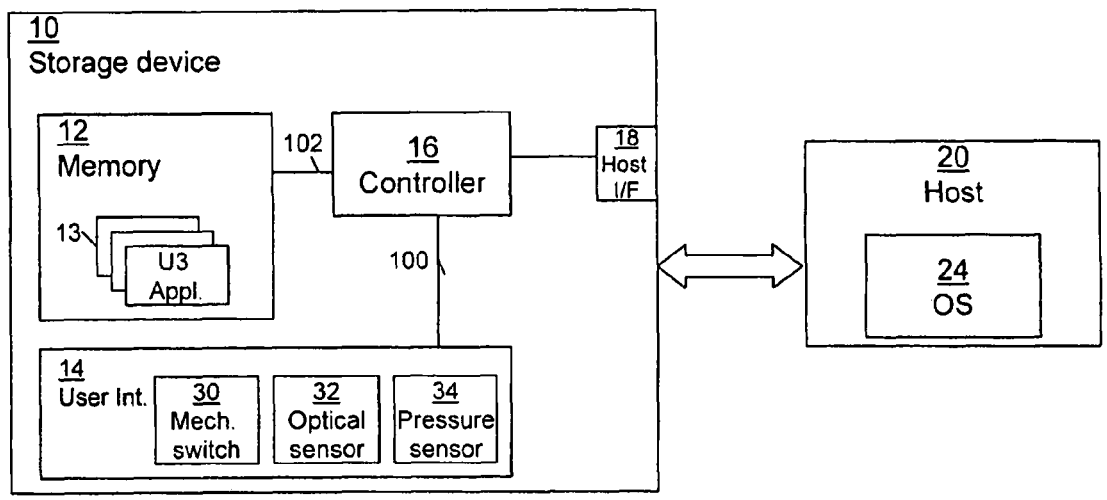
FIG. 1 is a block diagram of a storage device used for mounting to a host, according to one exemplary embodiment.

FIG. 1 is a block diagram of a storage device 10 that is used for mounting to a host 20, according to one embodiment. Storage device 10, being a USB flash memory device for example, typically includes a non-volatile memory 12 (such as a FLASH memory) for storing data, an input device (such as user-interface 14), and a controller 16 for managing operation of memory 12.

Controller 16 manages memory 12 via data and control lines 102 and communicates with host 20 via host interface 18. Controller 16 controls all the data transfer to/from memory 12 and data transfer to/from host 20 by controlling, for example, "read", "write" and "erase" operations, and so on.

The input device, being coupled to controller 16, is operable directly, or indirectly by a user, and/or by an external device prior to mounting storage device 10 to host 20 for selecting an operating mode of storage device 10. The operating mode may be selected from among two or more possible operating modes of storage device 10.

Note that in contrast to the prior art, where a storage device is provided with a read/write enable switch providing enhanced protection against accidental data loss once the storage device is already connected to a host by reversibly disabling and enabling read and/or write functionalities, for example; the input device of the exemplary embodiments is operable for setting an operating mode of storage device 10 before storage device 10 is mounted to a host. In other words, while a read/write enable switch is not meant for controlling the functionality of the device, storage device 10 is set herein on a selected operating mode by a user operating an embedded input device "off-line", so that the storage device is immediately activated in the desired operating mode once mounted to a host.

In the context of this description, an "operating mode" of a storage device represents a particular type of a storage device, and/or particular configuration/format mode of a storage device.

According to non-limiting examples, an operating mode of storage device 10 may operate storage device 10, and further have storage device 10 be recognized by a host on which storage device 10 is mounted to as a hard disk drive(s), a read-only device(s) such as a CD (Compact Disk) ROM, a floppy disk drive(s), a U3 form factor device containing U3 based application, and/or any other removable mass storage device, whether it is a USB end-point device or not.

Additionally or alternatively, an operating mode of storage device 10 may determine the way storage device 10 interacts with a host and/or the way information is stored on storage device 10. Such operation control may be applied with respect to the specific operating system of the host of which storage device 10 is mounted to, so that setting storage device 10 on a first operating mode may instruct controller 16 to format storage device 10 in one way, while setting storage device 10 on a second operating mode may instruct controller 16 to format storage device a different way.

For example, a user wishing to use his/her storage device with a host supporting the Windows® operating system, for example, may set storage device 10 on a different operating mode than he/she would do before using storage device 10 with a host supporting Linux® operating system. Thus, activating one type of file system management process for the Windows® operating system (e.g., NTFS (New Technology File System) format) and a different type of file system management process for the Linux® operating system (e.g., FAT 32 (File Allocation Table) format), for example.

Additionally or alternatively, an operating mode of storage device 10 may determine the way in which storage device 10 interacts with a host. In other words, setting storage device 10 on a first operating mode may instruct controller 16 to format storage device 10 in one way, while setting storage device 10 on a second operating mode may instruct controller 16 to format storage device a different way.

With user-interface 14 being a multi-positioning switch for example, a user may operate user-interface 14 on any one or more operating modes, for setting storage device 10 to be operable in a combination of ways, according to the various functionalities presented herein above.

User-interface 14 may include a mechanical switch 30 (such as a hardware switch positioned on one of a plurality of positions, or push buttons that are pressed on for setting the storage device on one operating mode and pressed off for setting on another operating mode), an optical sensor(s) 32 (such as a light sensor that is covered for setting on one operating mode and exposed for setting on another operating mode), a pressure sensor(s) 34 (implemented using a capacitive sensor, for example, that are manipulated (e.g., held, rotated, etc.) one way for setting the storage device on a first operating mode and manipulated another way for setting the storage device on another operating mode), etc.

A basic, exemplary control over the operation of storage devices 10 is performed as follows: A user operates user-interface 14 of storage device 10 and selects an operating mode of storage device 10. Storage device 10 (set on the selected operating mode) is then mounted to host 20 and communication between storage device 10 and host 20 is established.

Communication between storage device 10 and host 20 may be via communication channel C2 or via any communication link known to those skilled in the art, including a USB port connection into which a storage device is physically coupled, an optical port connection, an electrical port connection, etc. With storage device 10 being in communication with host 20 over a conventional wired or wireless communication link, such communication link can be a wired or wireless port.

Once storage device 10 is mounted to host 20, controller 16 communicates with user-interface 14 for establishing the selected operating mode of storage device 10 and for managing memory 12 according to the selected operating mode. In order to facilitate operational management of storage device 10 by controller 16, signals are transmitted (either continually, occasionally, or intermittently) from user-interface 14 to controller 16 over control line 100, when storage device 10 is mounted to host 20.

Figure 3A:
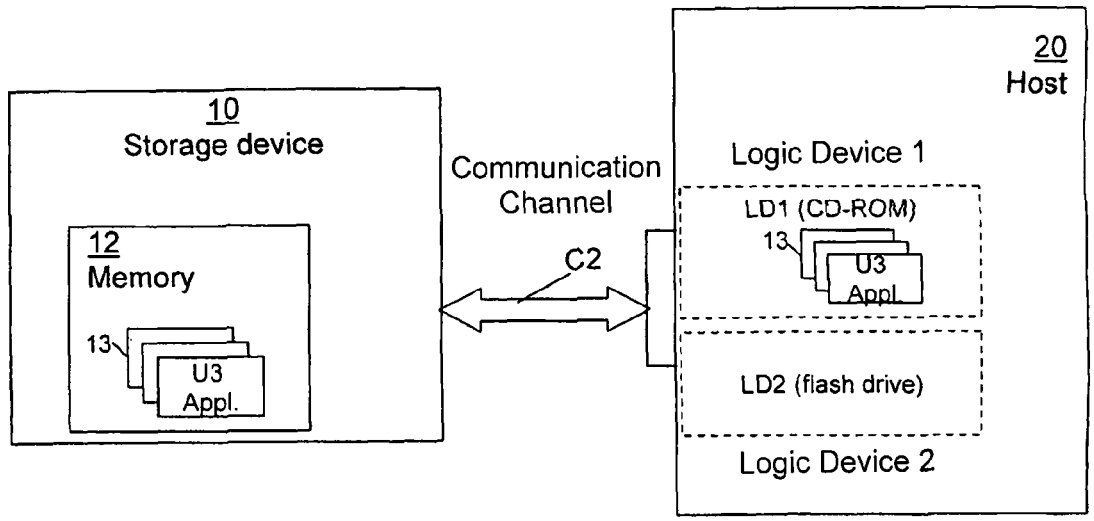
FIG. 3A shows the way the storage device of FIG. 1 is presented to a host, with the mechanical switch set to position 102.
Figure 3B:
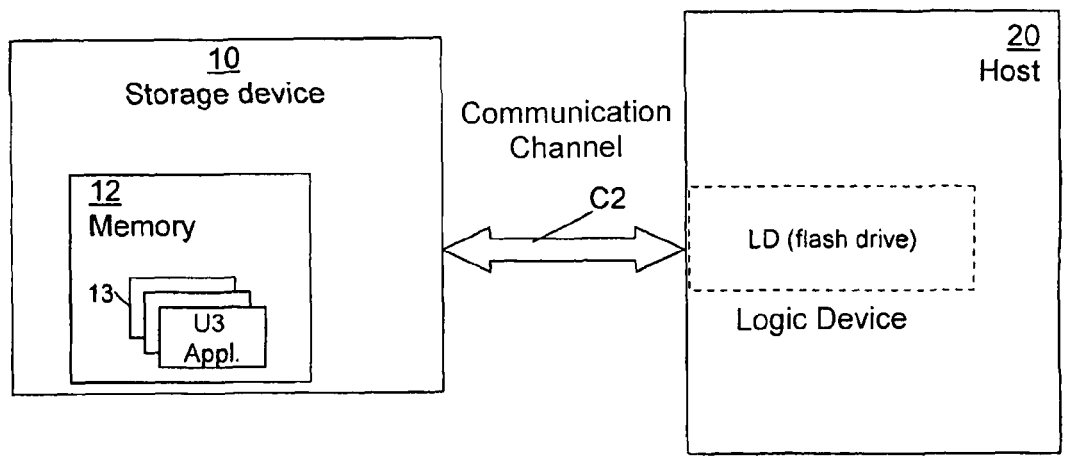
FIG. 3B shows the way the storage device of FIG. 1 is presented to a host, with the mechanical switch set to position 100.

Controller 16 interfaces with user-interface 14 for emulating storage device 10 on an OS (Operating System) 24 of host 20 as one or more logical devices and for establishing a communication channel between host 20 and one of these logical devices, according to the selected operating mode (see FIGS. 3A and 3B).

Hence, operating user-interface 14 of storage device 10 on a selected operating mode as such affects the way controller 16 interacts with a host once storage device 10 is mounted to the host.

For the sake of example only, storage device 10 has a configuration complying with a U3 technology device (supporting U3 based applications 13; and is operated by mechanical switch 30.

A user wishing to use storage device 10 as a U3 form factor device supporting U3 applications brings mechanical switch 30 to a first position (such as position 102, see FIG. 2) prior to mounting storage device 10 to a host (such as host 20). A user wishing to use storage device 10 as a regular mass storage device (not supporting U3 applications) brings mechanical switch 30 to a different position (such as position 100, see FIG. 2) prior to mounting storage device 10 to host 20. By setting mechanical switch 30 at position 100, storage device 10 can be used and accessed just like a normal USB storage disk or memory key.

If storage device 10 is mounted to host 20 with mechanical switch 30 set to position 102, then controller 16 presents (emulates) storage device 10 to OS 24 of host 20 as two separate (logical) devices—a first device being a read-only device emulating a CD-ROM drive with an automatic configuration for executing U3 application for example, and a second device being a standard mass storage (flash) drive for example (see FIG. 3A).

However, if storage device 10 is mounted to host 20 with mechanical switch 30 set to position 100, then storage device 10 is presented to host 20 as a single removable mass storage device not supporting U3 application (see FIG. 3B).

As a result, a user not wishing to use the U3 based applications that are pre-launched on storage device 10 can deactivate the U3 functionality prior to mounting storage device 10 to a host; and optionally reactivate this functionality before mounting storage device 10 to a host (either the same host or a different host) at a later point in time. Operating storage device 10 as such is time beneficial, as it provides a hardware based solution for users wishing to prevent the automatic loading of the U3 functionality (of the Autorun feature that is used by the U3 Launchpad for emulating itself as a virtual CD drive in Windows® operating system, for example) at a time when the U3 functionality is not desired to the user.

It should be appreciated that although user-interface 14 is provided for selecting an operating mode of storage device 10, user interface 14 may also be employed for other reasons. As an example, user-interface 14 may be employed for testing purposes that are applied directly to storage device 10 during manufacturing.

Figure 2:
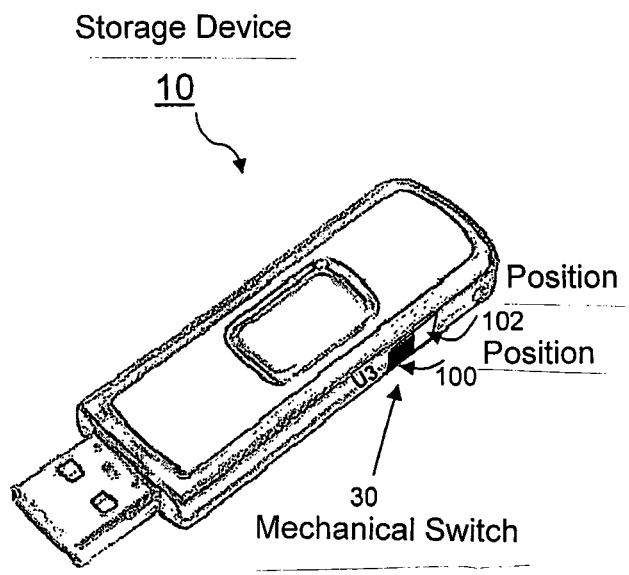
FIG. 2 is a schematic illustration of the storage device of FIG. 1, operated by mechanical switch.

FIG. 2 is a schematic illustration of storage device 10 of FIG. 1 that is operated by mechanical switch 30. With respect to the non-limiting example provided herein above, mechanical switch 30 is configured to operate on one of two different positions (position 100 or position 102).

Mounting storage device 10 to a host with mechanical switch 30 set to position 100 sets storage device 10 on a first operating mode (e.g., functioning as a regular mass storage device). Whereas, mounting storage device 10 to a host with mechanical switch 30 set to position 102 sets storage device 10 on a second operating mode (e.g., functioning as a U3 form factor device having U3 based applications).

FIG. 3A shows the way storage device 10 of FIG. 1 is presented to host 20, with mechanical switch 30 set to position 102.

Mounting storage device 10 to host 20 with mechanical switch 30 set to position 102 causes storage device 10 present (emulate) to OS 24 of host 20 two separate (logical) devices—a first device (recognized by host 20 as logic device LD1) being a read-only device emulating a CD-ROM drive with an Autorun configuration for executing U3 application for example, and a second device (recognized by host 20 as logic device LD2) being a standard mass storage (flash) drive for example.

After storage device 10 is plugged into host 20, a launch application resident on storage device 10 (recognized by host 20 as logic device LD1) launches U3 applications 13 onto OS 24 of host 20. These applications then start running from OS 24 of host 20.

Note that communication between host 20 and storage device 10 (and either one of logic device LD1 and logic device LD2) is enabled via communication channel C2.

FIG. 3B shows the way storage device 10 of FIG. 1 is presented to host 20, with mechanical switch 30 set to position 100.

Mounting storage device 10 to host 20 with mechanical switch 30 set to position 100 causes controller 16 to present storage device 10 to host 20 a single removable mass storage device (recognized by host 20 as logic device LD) not supporting U3 applications, for example. Note that U3 applications 13 are still stored on memory 12 of storage device 10 (they are just not recognized by OS 24 of host 20). Again, communication between host 20 and storage device 10 (and logic device LD) is enabled via communication channel C2.

Figure 4:
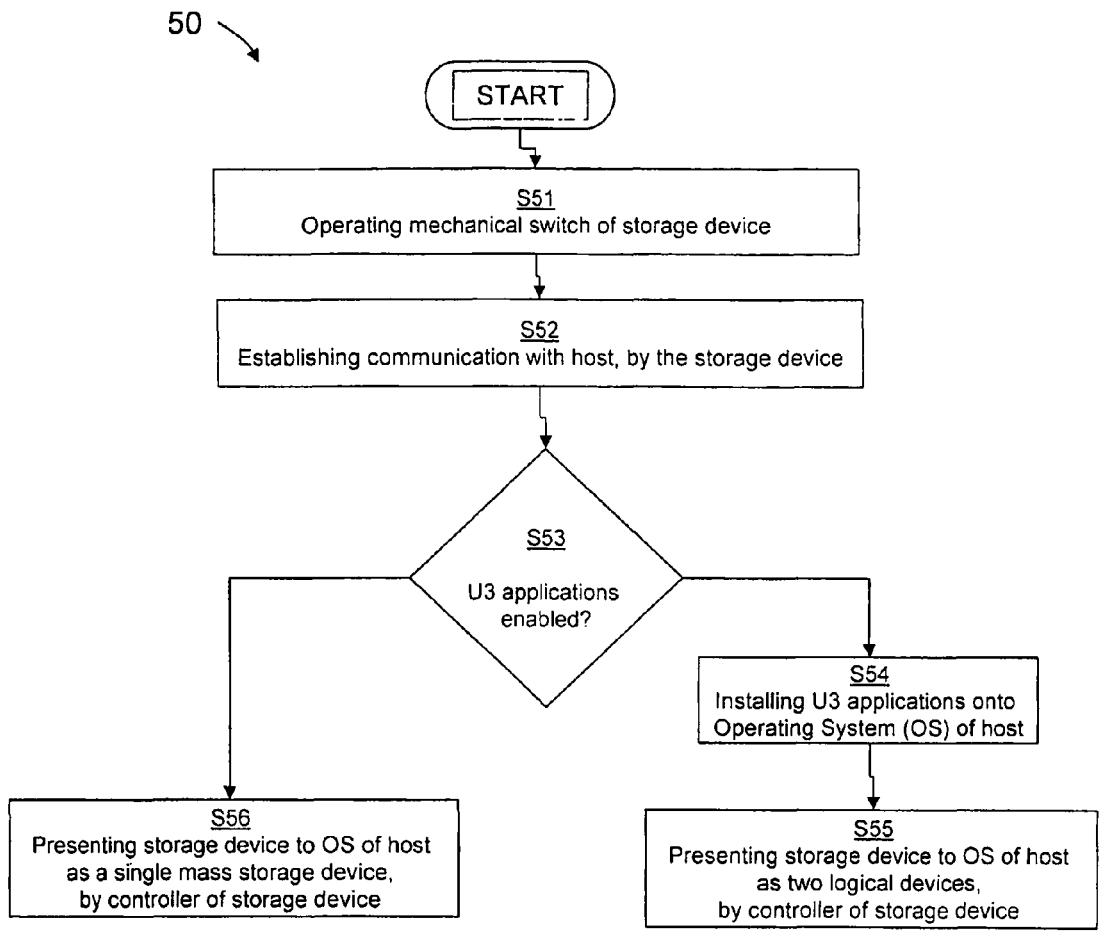
FIG. 4 is a flow chart of a method for using a storage device with a host, according to an exemplary embodiment.

FIG. 4 is a flow chart of a method 50 for using storage device 10 with a host, according to an exemplary embodiment. With respect to the example provided herein above, storage device 10, being a USB flash device for example, is configured as a U3 device supporting U3 applications that is operated by mechanical switch 30.

At step S51, mechanical switch 30 is operated by a user wishing to use/not use storage device 10 as a U3 device. A user wishing to use storage device 10 as a U3 device supporting U3 applications brings mechanical switch 30 to a first position (such as position 102) prior to mounting storage device 10 to a host. A user wishing to use storage device 10 as a regular mass storage device (not supporting U3 applications) brings mechanical switch 30 to a different position (such as position 100) prior to mounting storage device 10 to a host.

Then at step S52, storage device 10 is mounted to a host (such as host 20) and communication is established therebetween.

At S53, controller 16 of storage device 10 determines whether storage device is supporting the U3 applications residing on it, or not. This may be achieved by controller 16 sensing whether mechanical switch 30 is set to position 102 or to position 100.

In case storage device 10 is mounted to host 20 with mechanical switch 30 set to position 102 (i.e., storage device 10 is set to support U3 applications), then the U3 applications (S54) is installed onto OS 24 of host 20; and controller 16 presents (emulates) storage device 10 to OS 24 of host 20 as two separate (logical) devices (S55)—a first device being a read-only device emulating a CD-ROM drive with an automatic configuration for executing U3 application for example, and a second device being a standard mass storage (flash) drive for example.

However, if storage device 10 is mounted to host 20 with mechanical switch 30 set to position 100 (i.e., storage device 10 is set to disable the use of U3 applications) (at S56), then storage device 10 is presented to host 20 as a single removable mass storage device not supporting U3 application.

It should be noted that using the storage device as a U3 device as such is meant as a mere example. The storage device of the exemplary embodiments having a user-input device (such as a mechanical switch) is not limited for enabling/disabling U3 based applications as such, and is applicable for enabling/disabling any of a variety of features that a user may want to set before mounting the storage device to a host.

As will be appreciated by those familiar in the art, current devices employ a wide variety of different architectures and it is expected that new architectures will continue to be developed. In general, the exemplary embodiments may be employed in conjunction with a wide variety of different types and/or number of storage devices.

The embodiments, various examples of which are described herein, may be realized in hardware, software, firmware or any combination thereof A typical combination of hardware and software could be a general purpose computer system with a computer program that, when being loaded and executed, controls the computer system such that it carries out the methods described herein. The concepts described above can also be embedded in a computer program product, which comprises all the features enabling the implementation of the embodiments described herein, and which, when loaded in a computer system is able to carry out these embodiments. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Having described the various embodiments of systems and a method, it is to be understood that the description is not meant as a limitation, since further modifications will now suggest themselves to those skilled in the art, and it is intended to cover such modifications as fall within the scope of the appended claims.

What is claimed is:

1. A storage device comprising:
a memory for storing data;
an input device operative to choose a selected operating mode from among multiple operating modes of the storage device prior to mounting the storage device on a host, the multiple operating modes including a first operating mode that presents both a first logical device and a separate second logical device simultaneously to the host; and
a controller coupled to the input device and the memory and configured to present, as selected by the input device, the selected operating mode to the host when the storage device is mounted on the host.

2. The storage device of claim 1, where the multiple operating modes further include a second operating mode that presents a single logical device to the host.

3. The storage device of claim 1, where the first logical device comprises an emulated Compact Disc drive.

4. The storage device of claim 1, where the separate second logical device comprises a read-write mass storage device.

5. The storage device of claim 1, where the first logical device comprises an autorun configuration that automatically executes an application on the host when the storage device is mounted to the host.

6. The storage device of claim 1, wherein the memory comprises three-dimensional memory.

7. A method comprising:
selecting, with an input device, a selected operating mode from among multiple operating modes of a storage device prior to mounting the storage device on a host, the multiple operating modes including a first operating mode that presents both a first logical device and a separate second logical device simultaneously to the host; and
controlling the storage device to present, as selected by the input device, the selected operating mode to the host when the storage device is mounted on the host.

8. The method of claim 7, where the multiple operating modes further include a second operating mode that presents a single logical device to the host.

9. The method of claim 7, where the first logical device comprises an emulated Compact Disc drive.

10. The method of claim 7, where the separate second logical device comprises a read-write mass storage device.

11. The method of claim 7, where the first logical device comprises an autorun configuration that automatically executes an application on the host when the storage device is mounted to the host.

12. The method of claim 7, wherein the storage device comprises three-dimensional memory.

13. A storage device comprising:
a non-volatile memory for storing data;
an input device operative to select an operating mode of the storage device prior to mounting the storage device to a host, each operating mode representing a different type of storage device; and
a controller being operative to control the non-volatile memory, the controller interfacing with the input device to establish the selected operating mode of the storage device once the storage device is mounted, wherein the controller is further operative to present the selected operating mode to the host.

14. The storage device of claim 13, wherein the input device is a user-interface.

15. The storage device of claim 13, wherein at least one type of storage device represents a removable storage device.

16. The storage device of claim 13, wherein storage device is of type including one of a CD, a hard disk drive, or a floppy disk drive.

17. The storage device of claim 13, wherein the non-volatile memory has a configuration in accordance with flash memory technology.

18. The storage device of claim 13, wherein the input device is selected from the group consisting of a mechanical switch, an optical sensor, and a pressure sensor.

19. The storage device of claim 13, wherein the non-volatile memory comprises three-dimensional memory.

20. A method of using a storage device, comprising:
 selecting an operating mode of a storage device based on a setting of an input device of the storage device, each operating mode representing a different type of storage device;
 mounting the storage device to a host; and
 presenting the selected operating mode to the host after the storage device is mounted to the host.

21. The method of claim 20, wherein the input device is a user-interface.

22. The method of claim 20, wherein at least one type of storage device represents a removable storage device.

23. The method of claim 20, wherein storage device is of type including one of a CD, a hard disk drive, or a floppy disk drive.

24. The method of claim 20, wherein the non-volatile memory has a configuration in accordance with flash memory technology.

25. The method of claim 20, wherein the input device is selected from the group consisting of a mechanical switch, an optical sensor, and a pressure sensor.

26. The method of claim 20, wherein the storage device comprises three-dimensional memory.

* * * * *